Dec. 6, 1949  W. B. BARNES  2,490,503
AUTOMATIC SPEED CHANGE TRANSMISSION
Filed June 18, 1943  8 Sheets-Sheet 1

INVENTOR.
WILLIAM B. BARNES,
BY
Hood & Hahn
ATTORNEYS.

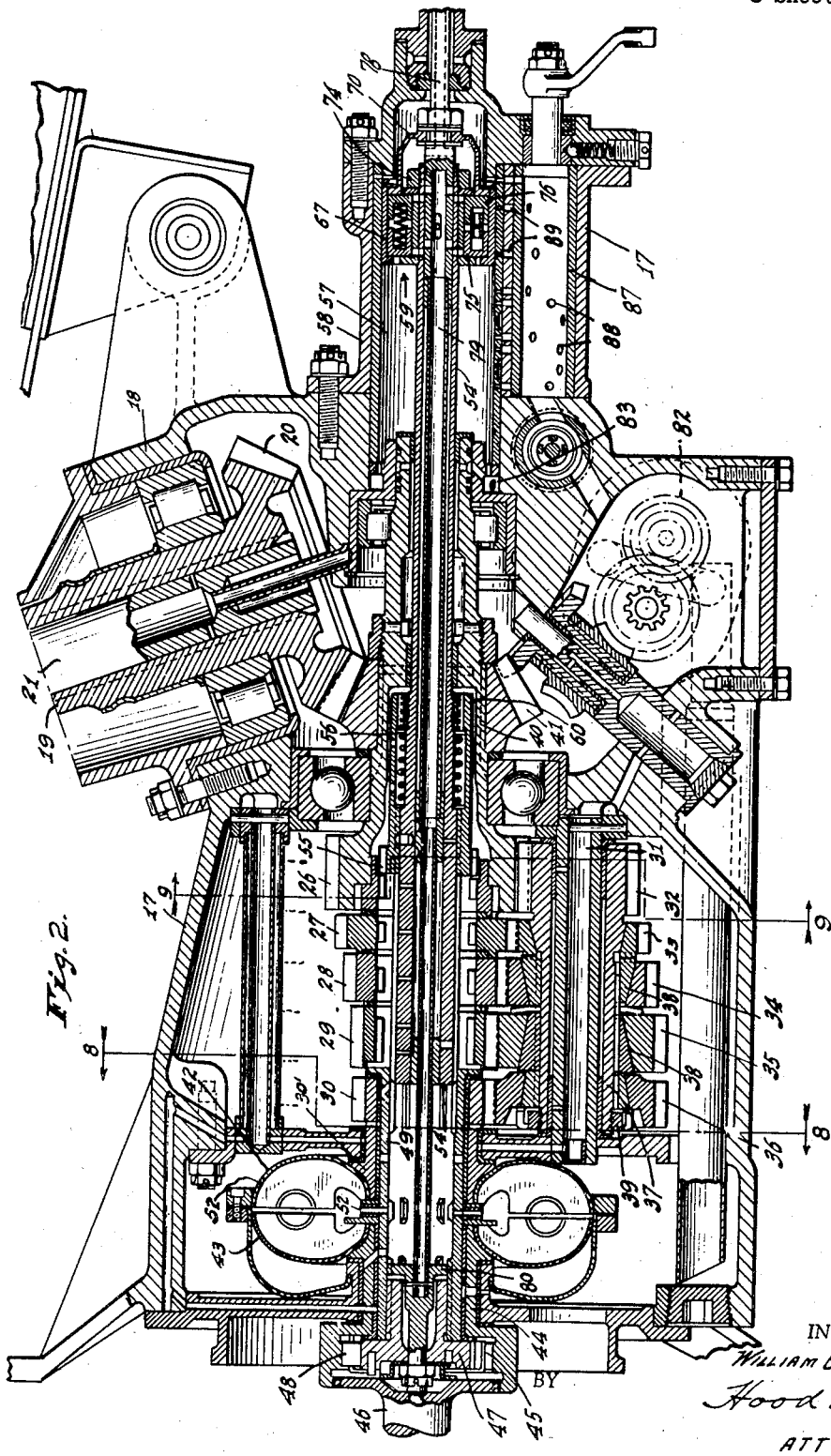

Dec. 6, 1949 W. B. BARNES 2,490,503
AUTOMATIC SPEED CHANGE TRANSMISSION
Filed June 18, 1943 8 Sheets-Sheet 3
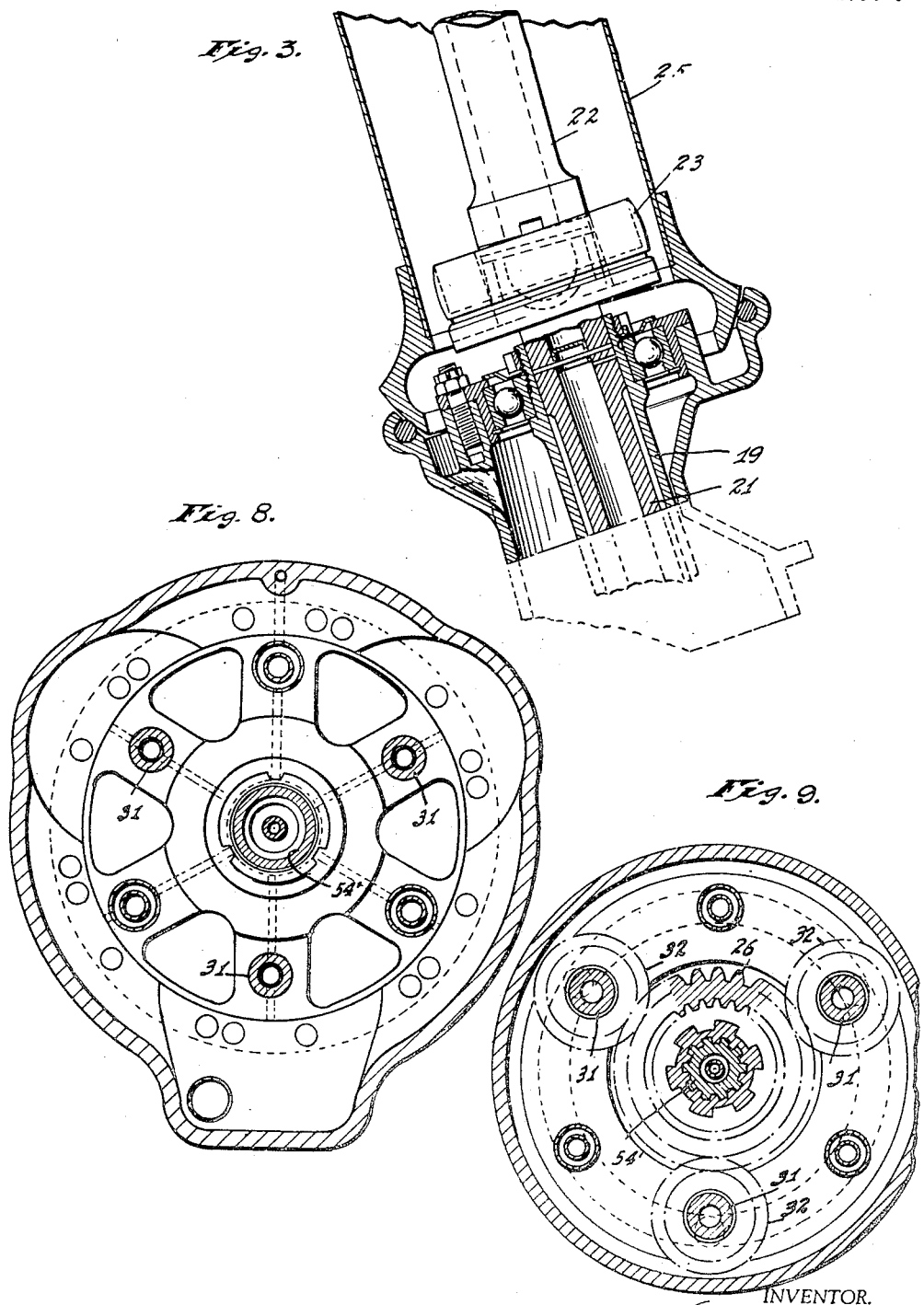
INVENTOR.
WILLIAM B. BARNES,
BY Hood & Hahn
ATTORNEYS.

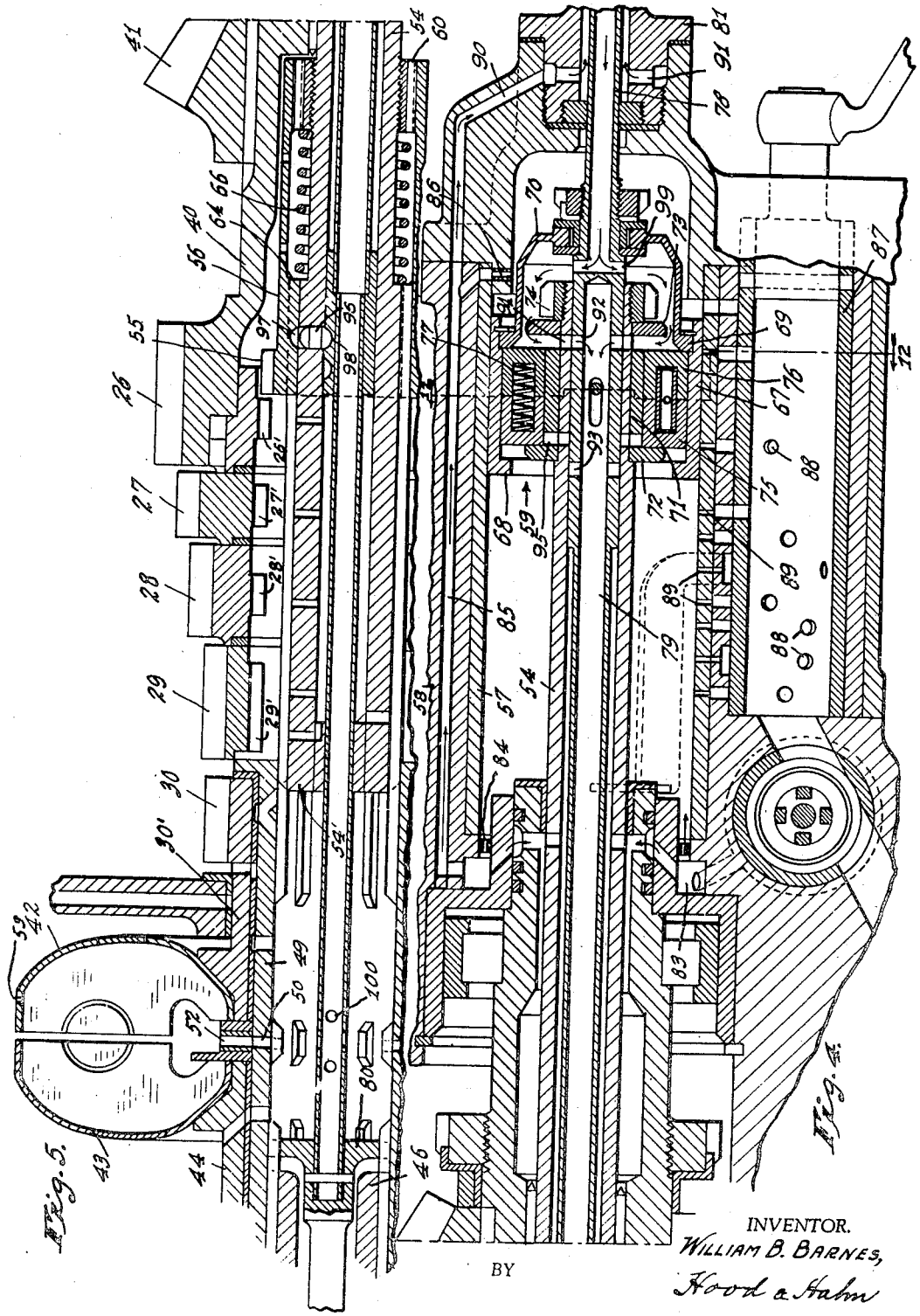

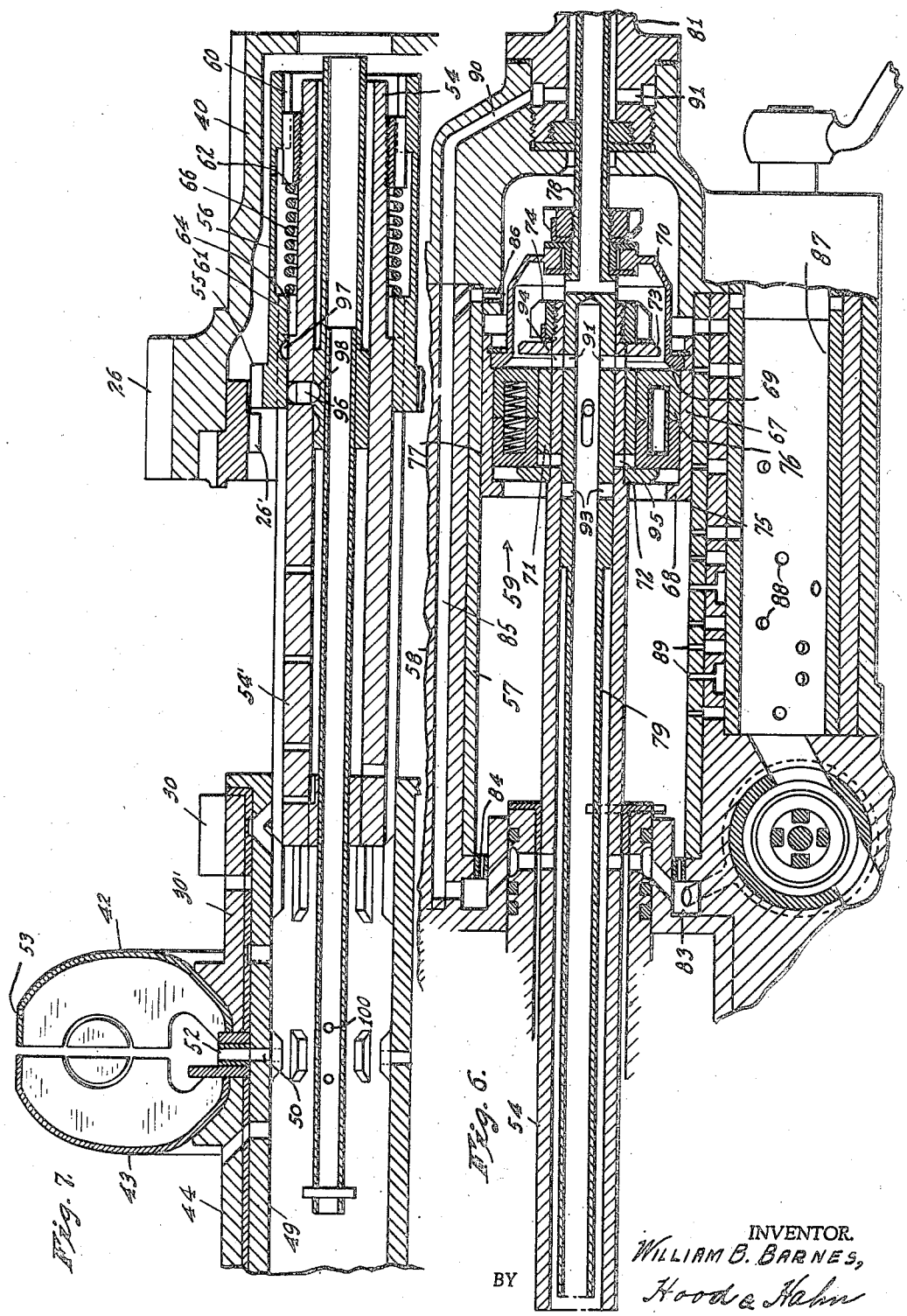

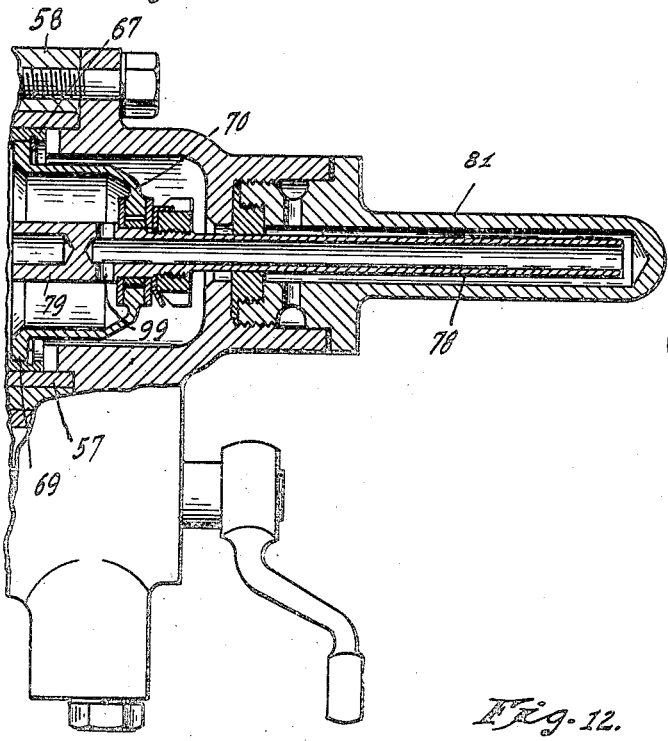
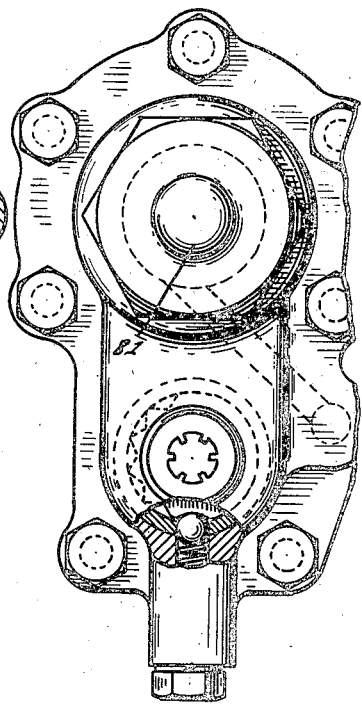
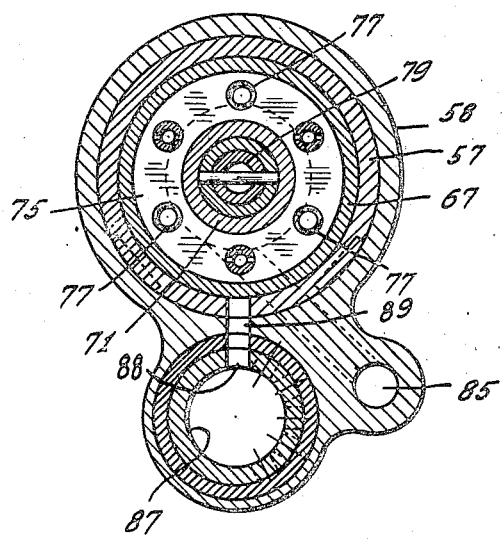

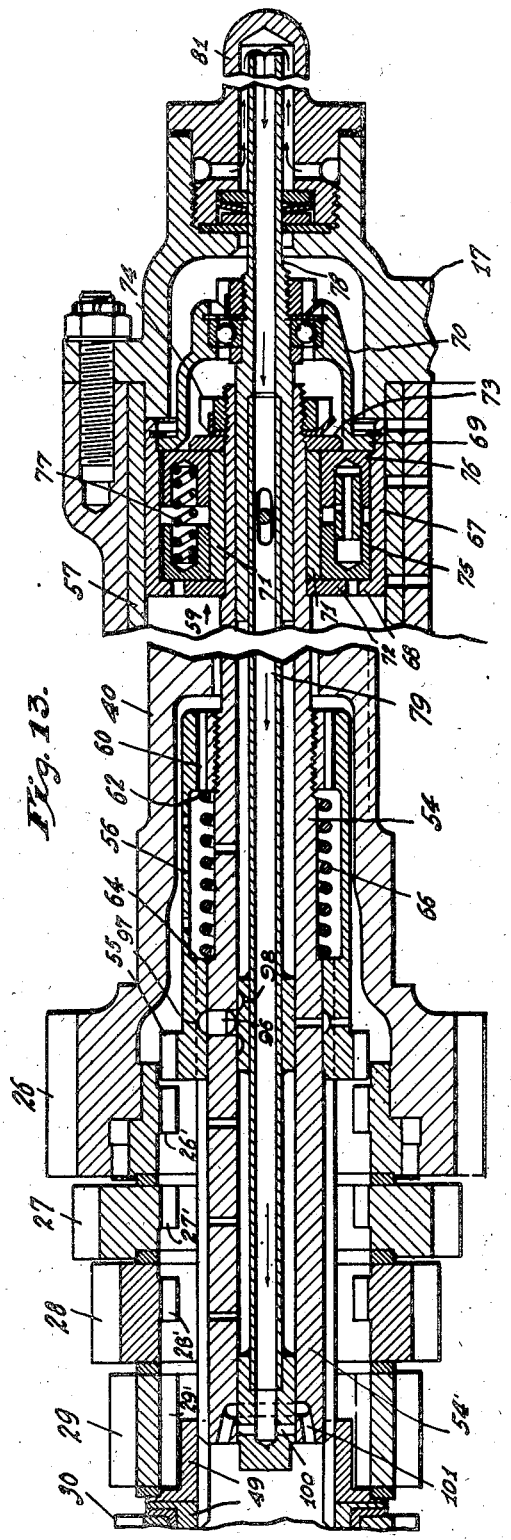

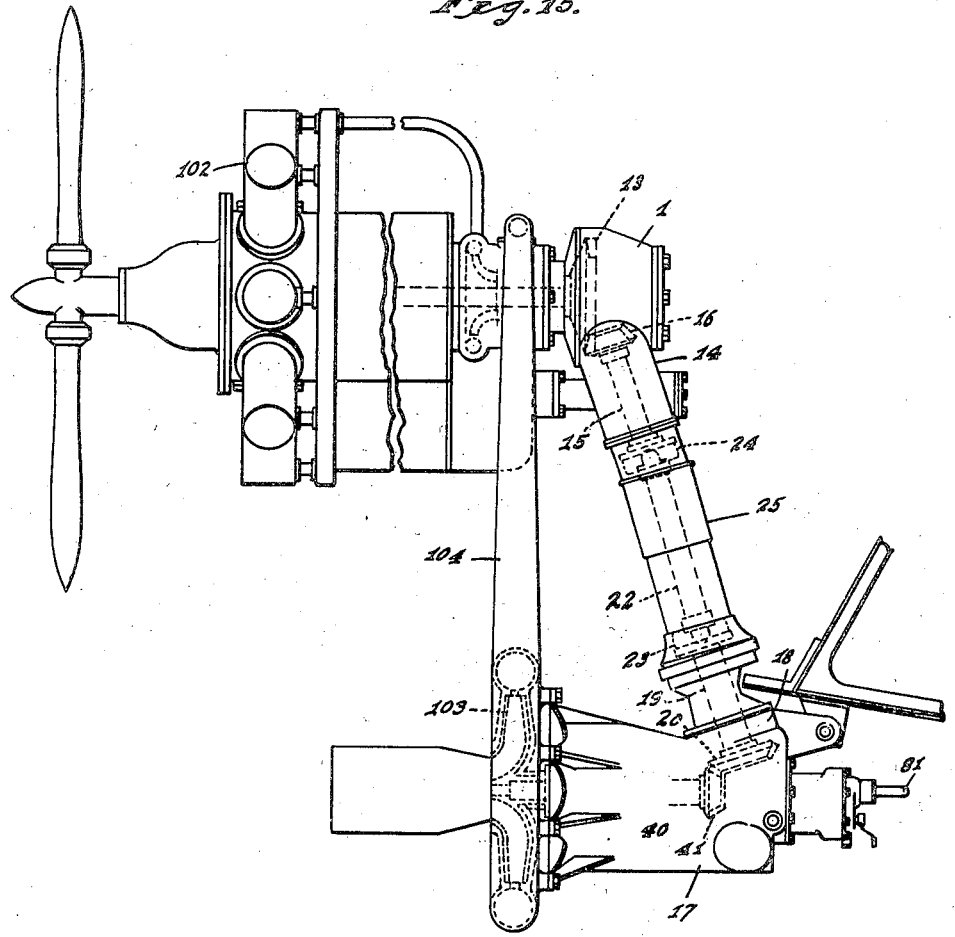

Patented Dec. 6, 1949

2,490,503

UNITED STATES PATENT OFFICE 2,490,503

AUTOMATIC SPEED CHANGE TRANSMISSION

William B. Barnes, Muncie, Ind., assignor to Barnes Motor Developments Company, Muncie, Ind., a partnership consisting of William B. Barnes and Freda Arthur Barnes Application June 18, 1943, Serial No. 491,284

28 Claims. (Cl. 74—732)

The present invention relates to improvements in transmissions, and more particularly to speed changing transmissions, and specifically the invention is particularly applicable to speed changing transmissions for driving a supercharger of a gasoline engine of that type used for operating airplanes.

One of the objects of the invention is to provide a speed changing mechanism wherein the driving element or driven shaft will be in driving relationship with the driving shaft or driving element, during change from one driving speed to another driving speed so that the vehicle propelled through the speed changing mechanism will always be positively driven and there will be no coasting on the part of the vehicle.

Another object of the invention is to provide a means for picking up the drive between the driving element and the driven element to thereby relieve the speed changing elements themselves of any load during the shift from one speed to another to thereby permit a ready shift of the parts.

Another object of the invention is to provide a speed changing mechanism wherein the low speed drive is the direct drive between the driving element and the driven element and the increment in speed is provided through a series of speed changing gears, and to provide means whereby the driven element will be increased in speed to permit the shift from a lower speed to a higher speed gearing combination.

A further object of my invention is to provide a speed changing mechanism in which there is arranged a plurality of speed changing gears axially aligned but dispensing with a supporting shaft for these gears to thereby permit the operation of a mechanism for effecting a drive through the gearing between the driving and driven shafts causing the gears to thus reduce space and complications.

A further object of my invention is to provide a fluid pressure operating means for effecting the shift from one speed to another through said gearing and for effecting a pick-up of the load by the driving element during this change speed shift.

Other objects and advantages of my invention will appear more fully hereinafter in the appended specification and claims.

For the purpose of disclosing the invention, I have illustrated certain embodiments thereof in the accompanying drawings, in which Fig. 1 is a longitudinal section of the drive take-off from the driving element;

Fig. 2 is a longitudinal section of the speed changing transmission;

Fig. 3 is a longitudinal section of the intermediate portion of the drive between the drive take-off and the transmission;

Figs. 4 and 5 are longitudinal sections showing more in detail the fluid control mechanism;

Figs. 6 and 7 are views similar to Figs. 4 and 5 showing the parts in a different shifted position;

Fig. 8 is a transverse section on the line 8—8 of Fig. 2;

Fig. 9 is a transverse section on the line 9—9 of Fig. 2;

Fig. 10 is a detail longitudinal section of the rear extension of the fluid control casing;

Fig. 11 is a rear end view of the transmission casing.

Fig. 12 is a sectional view on the line 12—12 of Fig. 4;

Fig. 13 is a longitudinal sectional view of a modification of the fluid pressure control;

Fig. 14 is a view, more or less diagrammatic, of the type of clutch used in connection with my invention; and Fig. 15 is a schematic elevation showing the association of the parts relative to a supercharger and an airplane engine.

Figure 1:
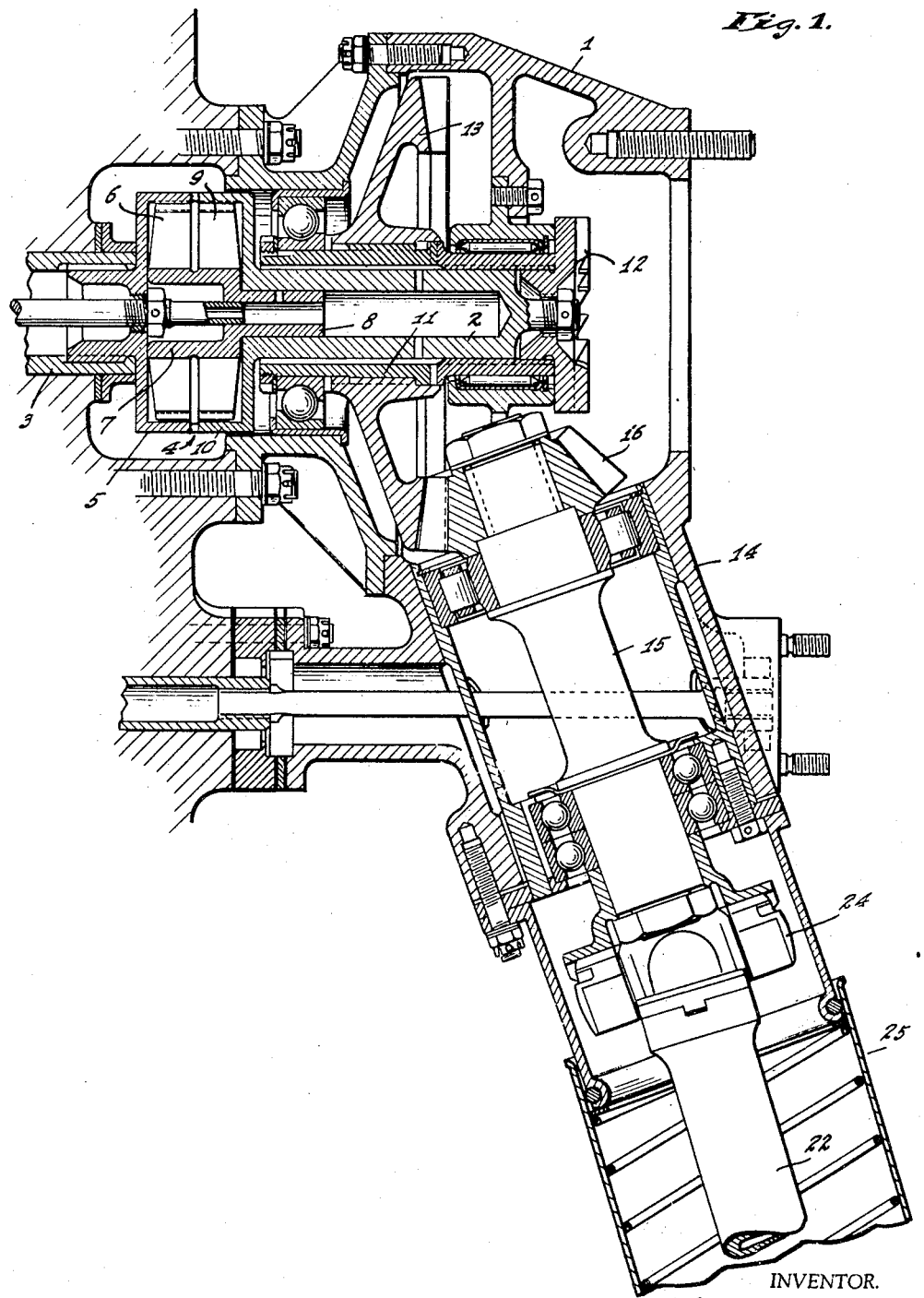

In the embodiment of the invention specifically illustrated for driving the supercharger for an engine for an airplane, the drive of the supercharger is taken from the crank shaft or other driving shaft of the engine, and to this end, the initial drive connection is made between the inertia starter clutch and the engine shaft. Accordingly, at the rear of the engine casing, I provide a casing 1 having mounted therein a shaft 2. The shaft, at one end, is connected to the crank shaft 3 of the engine through the medium of a coupling 4 comprising a housing 5 splined on the shaft 3. This housing has internal teeth engaging a series of radial arms 6 preferably of flat spring material and radiating from a hub 7 having a reduced extension 8 rotatably mounted in the end of the hollow shaft 2. A similar set of arms 9 on the hub 7 engages internal teeth in a housing 10 forming a part of the shaft 2. A sleeve 11 surrounds the shaft 2 having a splined connection with the shaft and this sleeve, at its rear end, has connected thereto, through the medium of internal splines, a one-way clutch member 12 adapted for engagement by a clutch member of the inertia starter for the engine. This sleeve 11 has splined thereon a bevel gear 13 which is the driving element for the speed changing transmission.

A downwardly and rearwardly extending portion 14 of the casing supports a shaft 15 carrying a bevel pinion 16 meshing with the bevel gear 13. The shaft 15 forms part of a shaft coupling connecting the transmission with the driving gearing above described.

The casing 17 for the transmission includes an upwardly and forwardly projecting extension 18 in which is rotatably mounted a sleeve 19 having, at its lower end, a bevel gear 20.

The sleeve of the shaft has splined thereon a hollow shaft 21 (see Fig. 3) which, at its upper end, is connected through a coupling shaft 22 having universal couplings 23 and 24 with the shaft 15, thus forming a driving connection between the engine and the transmission. A suitable casing 25 surrounds the drive shafts.

The speed changing transmission gearing which receives its drive from the bevel gear 20, comprises what may be termed a drive gear 26 and a plurality of driven gears 27, 28 and 29, and a secondary driven gear 30. The diameter of these respective gears decreases so that in the gearing combination each of the gears 27 to 30 will drive its driven part at an increased speed. The gears 27 to 29 are all arranged on a common axis and have an internal bore, the bore of all the gears being of the same diameter for a purpose more fully hereinafter to appear.

Surrounding the axis of the gears 27 to 30 is a series of countershafts 31, each of which carries a plurality of gears 32, 33, 34, 35 and 36, respectively meshing with the gears 26 to 30. Due to the disposal of the countershafts 31 and their respective gears about the gears 26 to 29, these gears are supported and maintained in position about a common axis solely by their engagement with the countershaft gears, thereby dispensing with a supporting shaft for the driving gears to thus permit the extension therethrough of suitable control mechanism to be more fully hereinafter described.

For driving the various connecting countershaft gears, the countershaft 31 is provided with a hollow sleeve 37 which has formed thereon the countershaft gear 32. This sleeve 37 has formed thereon, or splinedly connected thereto, a series of annular, substantially truncated, cone-shaped hubs 38 and the internal bore of the gears 33 and 36 are beveled to coincide with these hubs. When the gears are assembled on their cone-shaped hubs, they are forced into wedging position on these hubs through the medium of a nut 39 threaded on the end of sleeve 37 whereby, after the countershaft gears, which have been loosely mounted on their respective hubs, properly center their teeth in meshing engagement with the gears 27 to 30, the nut may be tightened, wedging the gears in their proper relationship on their hubs and thus securing the gears to the countershaft 37.

The hub 40 of the gear 26 has splined thereon a bevel gear 41 which meshes with, and is driven from, the bevel gear 20 and thus provides the driving gear of the speed changing transmission.

The gear 30 is formed on a hub or sleeve 30' which carries one member 42 of a fluid coupling. The other member 43 of this coupling is mounted on a hub 44 of the outer member 45 of an overrunning clutch, which outer member, in turn, is directly connected by toothed engagement with the driving shaft 46 of the supercharger. Thus, when the fluid coupling is energized, a drive is established from the gear 26 through the sleeve 37, the gears 30 and 36, and through the fluid coupling to the supercharger driving shaft 46.

The inner member 47 of the overrunning clutch, between which and the outer member 45, is provided engaging rollers 48, telescopes and is splined to a hollow shaft 49 which is adapted to be selectively driven from any one of the gears 26 to 29 at different speeds, to thereby drive the shaft 46 at various speeds through the overrunning clutch. The fluid under pressure is admitted to the fluid coupling from the hollow shaft 49 through an opening 50 in the shaft and this opening passes through internal axial splines in the shaft so that the inlet of the opening 50 extends inwardly beyond the inner periphery of the hollow shaft. The opening 50 communicates with suitable supply openings 52 with the interior of the fluid coupling and it is to be noted that this fluid coupling is provided with one or more bleed openings 53, the purpose of which will more fully hereinafter appear.

The hollow shaft 49 is provided with suitable oil outlets for the purpose of passing lubricating oil to various parts of the transmission and this oil is delivered from the hollow shaft 49 which, at all times, maintains a small amount of oil. Under normal circumstances, as the shaft rotates, this small amount of oil forms a film on the inner periphery of the shaft and, due to the axial splines 51, this film will not flow into the feed opening 50 and thus into the fluid coupling to have a tendency to energize the same. I am thus enabled to lubricate the parts through this hollow shaft without energizing the fluid coupling except when it is desired and under predetermined conditions.

The hollow shaft 49 is driven at different speeds through the medium of the gears 26 to 29 and the corresponding countershaft gears from a hollow shaft 54' which, at its forward end, has an internal splined connection with the shaft 49 and which, at its rear end, is provided with an extension hollow sleeve 54. To effect this drive, the internal diameters of the gears 26 to 29 are respectively provided with clutch teeth 26', 27', 28' and 29', which teeth are adapted to be selectively engaged by the clutch teeth 55 on an axially slidable member 56. The respective teeth 26' to 29' and the teeth 55 are of the type which will engage only when the two clutching members are rotating substantially at synchronism. One type of clutch which may be advantageously used in this connection is that which has become commercially known as the Maybach as illustrated in Fig. 14.

This clutch member 56 axially moves on, and is splinedly connected with, the sleeve 54 so that, as the sleeve 54 is rotated with the hollow shaft 54', the clutch teeth 55 are likewise rotated and thus, when the clutch teeth 55 are engaged with any one of the sets of teeth 26' to 29', the shaft 54' will be driven, and, through it, will drive the hollow shaft 49, thus, through the overrunning clutch, driving the driven shaft 46. Therefore, when the clutch teeth 55 are in engagement with the clutch teeth 26' of the gear 26 a direct drive is effected from the hub 40 of this gear 26 to the driven shaft 46. When the teeth 55 are in engagement with the teeth 27' of the gear 27, a drive will be effected from the gear 26 through the countershaft gears 32, the countershaft gear 33, and the next higher speed gear 28, and thence to the shaft 54', thus driving the shaft 46 at a higher speed than that which would be effective with the direct drive. Progressively, the clutch teeth 55 may engage the teeth 28' and 29' to step the speed up still further.

Due to the fact that the speeds of the respective gears 27, 28 and 29 are higher, it is necessary, in order that clutch teeth 55 may engage the clutch teeth of the next higher gear, that the two sets of clutch teeth attain substantial synchronism, and also, to permit the easy shifting of the clutch member 56, relieve the load between the clutch teeth 55 and the teeth with which it is engaged. In order to obtain this result, immediately before, or substantially at, the time of shift of the clutch teeth 55, the fluid coupling is energized by the admission of suitable oil to the interior thereof.

As has heretofore been pointed out, the driving member 42 of this fluid coupling is driven from the gear 30, the speed of which is greater than any of the other gears and, therefore, as soon as the fluid coupling becomes energized by the admission of oil thereto, the load will be picked up by this higher speed drive and a drive will be effected through the fluid coupling to the shaft 46 rather than through the clutch 55. As a result of this higher speed, the shaft 49, through the frictional drag of the overrunning clutch and through the ratcheting of the two relatively moving sets of teeth, has its speed accelerated and, as the load is relieved from the clutch, the engaging clutch teeth 55 will be accelerated until their speed is substantially in synchronism with the teeth to be engaged. The clutch will therefore engage to again drive the shaft 46 through the overrunning clutch. Likewise, when it is desired to move from a higher speed into a lower speed, the fluid coupling is again energized for relieving the load from the engaged cluch teeth. Under these circumstances, the clutch teeth 55, due to their ratcheting on the slower speed clutch teeth, will have their speed gradually reduced until the two sets of teeth are in synchronism and be engaged.

It must be remembered that with the drive through the fluid coupling, the only drive effected to the shaft 49 and to the clutch teeth 55 is as a result of the drag of this overrunning clutch and this drag would be readily overcome by the ratcheting of the sets of teeth so that the respective speeds of the clutch teeth will become quickly synchronized.

The sleeve 54 extends into a cylinder 57 within an extension 58 of the casing. Operating in this cylinder is a piston 59 which is adapted to move the clutch sleeve 56 and accordingly the clutch teeth 55. The operation of this piston also controls the admission of oil or other energizing fluid to the fluid coupling. To this end, and in order that sleeve 56 may be resiliently moved through the axial movement of the sleeve 54 by the operation of the piston 59, the sleeve 56 is splined at 60 onto the sleeve 54 and likewise at 61. The splines on the sleeves 56 and 54 are interdigitated and between the sets of splines is formed a recess which provides opposite shoulders 62 on the sleeve 56 and shoulders 64 on the sleeve 54. A coiled spring 66 surrounds the sleeve 54 within the recess above described and this spring is of sufficiently large diameter to be engaged by the shoulders 62 and 64 of the sleeves 56 and 54. Therefore, when the sleeve 54 is moved to the left, looking at Fig. 5, a shoulder 64 on the sleeve 54 will engage the spring tending to compress the same and force the spring against a shoulder 62 on the sleeve 56 and, if the sleeve 56 meets resistance as it would when moving from one set of teeth to the other, the spring 66 would be compressed. This provides a bias for forcing the cltuch teeth 55 into engagement with the clutch teeth of the gears when the two sets of teeth approach synchronism. The same effect would be produced if sleeve 54 would be moved to the right. Under these circumstances, the shoulder 64 on the left of the spring would engage the spring 66 forcing the same against the shoulder 62 on the right of the spring, thus forming a bias to push the sleeve 56 in the reverse direction.

The piston 59 is a composite structure. As a part of this piston there is provided a piston shell 67 having, at one end, an inturned annular shoulder 68 and receiving, at the other end, a flange 69 of a housing 70. Arranged within the piston shell 67 is a hub 71 having, at each end, annular flanges 72 and 73. This hub is fixed on the sleeve 54, one end abutting against a shoulder on the sleeve and the other abutting against a threaded nut 74. Surrounding the hub and within the cylinder 57 is a pair of annular pistons 75 and 76 spaced apart and biased in their spaced relation through the medium of coiled springs 77. The housing 70 surrounds and is secured to a hollow extension 78 of a hollow tube 79 arranged within the sleeve 54 and extending forwardly to be supported by a suitable splined support 80 within the hollow shaft 49. This extension 78 is arranged within an extension 81, Fig. 10, of the transmission casing but does not communicate directly with the hollow tube 79. Due to the connection between the housing 70 and the tube extension 78, the tube, of course, will be moved whenever the piston 59 as a whole is moved.

Fluid pressure is admitted to the cylinder 57 from a suitable fluid pressure pump 82 which may be of any desired structure and which supplies fluid under pressure to an annular chamber 83 communicating with the forward end of the cylinder 57 through restricted openings 84. This annular chamber 83 also supplies fluid under pressure to a conduit or passageway 85 which communicates through a suitable restricted opening 86 with the cylinder 57 on the opposite side of the piston 59. Therefore, under normal circumstances, the cylinder 57 is supplied with fluid under pressure on each side of the piston 59, which pressure being the same no movement would be occasioned by the fluid within the cylinder 57. The escape of the fluid from the cylinder, on either side of the piston 59, is controlled by a rotary valve 87 having suitable ports 88 therein, which ports are adapted to communicate with vent openings 89 in the cylinder 57. Fluid under pressure is also admitted to the extension 78 by an extension of the conduit 90 which communicates with a port 91 in the casing extension 81. The hollow tube 79 is provided with spaced ports 92 and 93 which are controlled by ports 94 and 95 in the hub 71.

In operation, we will assume that the parts are in the position illustrated in Fig. 2 and that no drive is taking place. If the operator desires to effect an initial drive, which will be what may be termed a low-speed drive, the valve 87 is rotated to a position wherein a vent 89 at the left of the cylinder 57 is opened. Under these circumstances the pressure on the left hand side of the piston will be reduced, thus creating a preponderance of pressure on the right hand side. Therefore the housing 70, and with it its piston valve 76, will be moved to the left with the flange 69 engaging the piston valve 76, moving this piston valve to the left against the bias of the spring 77 until this piston valve 76 abuts the piston valve 75. During this movement it is to be observed that the tube 79 is likewise moved to the left. With this movement to the left, locking pin 96, which is normally in the recess 97 in the sleeve 56, is released, being permitted to drop in a recess 98 in the tube 79, Fig. 5. By the time the valve piston 76 is collapsed against the valve piston 75, the ports 92 and 94 are placed in communication and fluid pressure flowing into the end of the tube extension 78 will pass out through ports 94 and through ports 92 into the tube 79 flowing forward in the tube and out through the ports 100 into the hollow shaft 49 where it is adapted to flow into the fluid coupling.

Due to the fact that the pin 96 is dropped into the recess 98, the sleeve 56 will be released or unlocked and with the valve piston 76 abutting the valve piston 75 which, in turn, abuts the flange 68, the sleeve 54 will be forced axially to the left moving the teeth 55 against the teeth 26'. At this time, however, the teeth 26' and the teeth 55 have a different relative rotation speed so that the teeth cannot engage. Therefore the sleeve 56 will not be moved further, although the sleeve 54 continues its axial movement placing the spring 66 under compression. The parts are then in the position illustrated in Figs. 6 and 7. It must be borne in mind, however, that during this operation fluid under pressure is being admitted to the fluid coupling which thus becomes energized and drives the shaft 46. At the same time, through the friction drag of the parts, the teeth 55 will commence to pick up speed, and when they approach, or approximately approach, synchronism, the teeth 55 will slip into engagement with the teeth 26' thus establishing the initial or low speed drive. By the time this has been effected, the piston shell 67 will have been moved far enough to the left to uncover a vent opening to the right of the piston cylinder so that fluid under pressure will escape from the cylinder 57 at the right hand side of the piston 59 thus equalizing the pressures on the right and left hand side of the piston. The control ports are spaced apart in such a manner that the two vent ports are slightly overlapped by the ends of the piston shell 67 so that eventually the pressures on each side of the piston 59 will again come to balance and the piston come to rest. By having a slight continuous vent from the opposite side of the piston 59 a hunting of the pistons will be prevented. By the time the clutch teeth have become engaged and the movement of the cylinder has ceased, the expansion of the spring 77 against piston valve 75 and the flange 72 will tend to move sleeve 54 relatively to the tube to move parts 92 and 94 out of alignment shutting off the supply of oil to the fluid coupling and with the supply of fluid shut off, the oil will bleed through the opening 53 and the fluid coupling will be deenergized thus releasing the drive to the gearing.

In Fig. 13 I have illustrated a modification of the valving arrangement for controlling the admission of energizing fluid to the fluid coupling. In the structure illustrated in this figure, the supply of fluid to the fluid coupling is divorced from the supply of fluid for operating the piston 59. Therefore, the tube 79 is made continuous having its inlet end at the rear end of the casing extension 81 and this casing extension is supplied with fluid under pressure from the pump by a conduit independent of that supplying the fluid to the cylinder 57. The forward end of the tube 79 is provided with an outlet port 100. Furthermore, there are no ports provided in the piston 59 for admission of fluid under pressure from the cylinder 57 to a tube 79. In operation, when a preponderance of fluid pressure is exerted on the right hand side of piston 59, the axial movement of this piston to the left will carry the entire tube 79 forward, therefore projecting the end of the tube beyond the shaft 54', opening the ports 100 and thus permitting the fluid coupling fluid to flow into the hollow shaft 49. The movement of the respective parts of the piston for effecting the engagement of the clutch member of the clutch teeth 55 is the same as heretofore described.

Obviously, when the speed is stepped down from a higher speed drive to a lower speed drive, the initial axial movement of the tube 79 will be to the right therefore placing the ports 100 in communication with the ports 101 in the end of the shaft 54 thus permitting the flow of fluid to the fluid coupling to energize the same.

In Fig. 15 I have illustrated an application of my invention to the drive of a supercharger for an airplane engine. As shown in this figure, the engine 102 has the casing 1 mounted at its rear. The supercharger 103 is arranged below the engine and has the casing 17 connected therewith while a suitable conduit 104 leads from the supercharger to the engine intake system.

I claim as my invention:

1. In a speed changing transmission, in combination, a plurality of speed changing gears arranged in axial alignment and having a center bore extending therethrough, inwardly projecting clutch teeth formed on the inner walls of said each of said speed changing gears, a driven member extending through the bore of said speed changing gears and adapted to drive a driven shaft, an axially movable clutch member on said driven member selectively movable into engagement with the respective inwardly projecting teeth of said speed changing gears, and means for driving said driven shaft independently of said speed change gears during each shifting of said clutch member into engagement with the respective clutch teeth of said gears.

2. In a speed changing transmission, in combination, a plurality of speed changing gears, a driven member adapted to drive a driven shaft, clutching means having interengaging members for selectively connecting said speed changing gears with said driven member, means for driving said driven shaft independently of said speed changing gears, means operated by the selective operation of said clutching means for automatically energizing said independent driving means upon each selective shift of said connecting means, and one-way driving means interposed between said driven member and said driven shaft automatically operative to release said driven member from said driving shaft, when said independent driving means is operative.

3. In a speed changing transmission, in combination, a driven shaft, a plurality of speed changing gears for said driven shaft, a driven member adapted to drive said driven shaft, one-way engaging means interposed between said driven member and said driven shaft, clutching means having interengaging members for selectively connecting each of said speed changing gears with said driven member, and means driving said driven shaft at a speed greater than through any of said speed changing gears for establishing independent drive for said driven shaft during the shifting of said clutching means to connect each of said speed changing gears to the driven member.

4. In a speed changing transmission, in combination, a driven shaft, a plurality of speed changing gears, a driven member adapted to drive said driven shaft, selective positive interengaging clutching means for connecting said different speed changing gears with said driven member, fluid pressure means for effecting a shift of said clutching means, a fluid coupling for driving said driven shaft independently of said speed changing means during the shift of said clutching means and driving means for drivingly connecting said driven shaft with said driven member releaseable when said clutching means and the fluid coupling are both effective.

5. In a speed changing transmission, in combination, a driven shaft, a plurality of speed changing gears, a driven member adapted to drive said driven shaft, fluid pressure means for shifting said clutching means to effect a change speed connection between said change speed gears and said driven member, and a fluid coupling for driving said driven shaft independently of said driven member during the shift of said clutching means and a control device operating automatically to release the drive between the shaft and driven member when said clutch means are engaged and said independent drive is effective.

6. In a speed changing transmission, in combination, a driven shaft, a plurality of speed changing gears, a driven member adapted to drive said driven shaft, clutching means having interengaging means for selectively connecting said speed changing gears with said driven member, fluid pressure operated means for effecting a shift of said clutching means, a fluid coupling for driving said driven shaft independently of said driven member during the shifting of said clutching means, means for energizing said fluid coupling prior to the shifting of said clutching means and deenergizing said fluid coupling upon the completion of engagement of said clutching means and driving means for drivingly connecting said driven shaft and driven member releaseable when said clutching means are in engagement and said fluid coupling is drivingly effective.

7. In a speed changing transmission, in combination, a plurality of speed changing gears, a driven member adapted to drive said driven shaft, a positive interengaging clutch member for each of said gears, an axially shiftable clutch member connected with said driven member and selectively movable into engagement with each of the clutch members of said respective gears, fluid pressure means for biasing said clutch member into engaging position, means for independently driving said driven shaft during each shift of said clutch member to permit said biasing means to move said clutch member into engaging position and fluid pressure means for effecting the operation of said independent drive means interrelated with said first mentioned fluid pressure means for effecting the operation of said independent drive means.

8. In a speed changing transmission, in combination, a driven shaft, a plurality of speed changing gears, a driven member, clutch teeth associated with each of said speed changing gears, a movable clutch member having clutch teeth for engagement with the clutch teeth of said gears, fluid pressure means for biasing said movable clutch member into engaging position, a fluid coupling for driving said driven shaft independently of said speed changing gears, and means for energizing said fluid coupling upon the rendering of said biasing means effective and for de-energizing said fluid coupling when said clutch means moves into engagement.

9. In a speed changing transmission, in combination, a plurality of speed changing gears each having a set of clutch teeth associated therewith, a driven shaft, a driven member adapted to drive said driven shaft, a clutch member connected to said driven member and adapted for engagement with the respective clutch teeth of said speed changing gears, a fluid coupling for driving said driven shaft independently of said driven member, fluid pressure means for effecting a bias of said clutch member into engagement with the respective clutch teeth of said speed changing gears, and a valve for controlling the admission of energizing fluid to said fluid coupling controlled by said fluid pressure means.

10. In a speed changing transmission, in combination, a driven shaft, a plurality of speed changing gears axially arranged and having a center bore extending therethrough, a driven member adapted to drive said driven shaft, a one-way clutch between said driven member and said driven shaft, a fluid drive for driving said driven shaft independently of said driven member, said driven member extending through the hollow bore of said speed changing gears, said speed changing gears having internal clutch teeth within their hollow bores, an axially movable member connected to said driven member and having clutch teeth for selective engagement with the clutch teeth of said speed changing gears, a fluid conduit extending through said driven member for conveying energizing fluid to said fluid coupling, a valve for controlling the admission of fluid to said fluid conduit, and fluid pressure means for biasing said clutching member into engaging position and adapted to operate said valve to shut off said fluid control after said clutching member has been moved into clutching engagement with the teeth of a selected speed changing gear.

11. In combination, a driving shaft and a driven shaft, a driven member, one way engaging means for establishing a drive between said driven member and said driven shaft, means for selectively driving said driven member from said driving shaft at a plurality of speeds and means for driving said driven shaft independently of and at a greater speed than any of said multi-speed drives, said one way engaging means releasing said driven shaft from said driven member when said independent drive and any of said multi-speed drives are effective.

12. In combination, a driving shaft and a driven shaft, a driven member, one way engaging means for establishing a drive between said driven member and said driven shaft, means for selectively driving said driven member from said driving shaft at a plurality of speeds and means for driving said driven shaft from said driving shaft independently of and at a greater speed than any of said multispeed drives including a fluid coupling, said one way engaging means releasing said driving shaft from said driven member when said independent drive and any of said multi-speed drives are effective.

13. In combination, a driving shaft and a driven shaft, a driven member, one way engaging means for establishing a drive between said driven member and said driven shaft, means for selectively driving said driven member from said driving shaft at a plurality of speeds including positive interengaging clutch members and means for driving said driven shaft from said driving shaft independently of and at a greater speed than any of said multi-speed drives, said one way engaging means releasing said driven member from said driven shaft when said interengaging clutch members are engaged and said independent drive is effective.

14. In combination, a driving shaft and a driven shaft, a driven member, one way engaging means for establishing a drive between said driven member and said driven shaft, means for selectively driving said driven member from said driving shaft and at a plurality of speeds, including positive interengaging clutch members and means for driving said driven shaft from said driving shaft independently of and at a greater speed than any of said multispeed drives including a fluid coupling, said one way engaging means releasing said driven member from said driven shaft when said clutch members are engaged and said fluid coupling drive is effective.

15. In combination with a driving shaft and a driven shaft of a multispeed drive including a driven member, a one way drive between said driven member and said driven shaft releaseable when said driven shaft is driven at a speed greater than that of the driven member, means for selectively driving said driven member through said multispeed drive and an independent drive between said driving shaft and said driven shaft bridging said driven member and said one way drive for driving said driven shaft at a greater speed than said driven member and including a fluid coupling.

16. In a speed changing transmission, in combination, a plurality of speed changing gears, selective means for selectively connecting said gears with a driven member adapted to drive a driven shaft, a one-way drive connection between said driven member and said driven shaft, means for shifting said selective means in one direction to effect an increase in the speed of said driven shaft and in the opposite direction after an increase of speed has been effected to decrease the speed of said driven shaft, means for driving said driven shaft indpendently of said speed changing gears and means for rendering said independent driving means effective prior to and during the shifting of said selective means in either direction.

17. In a speed changing transmission, in combination, a plurality of speed changing gears, selective means for selectively connecting said gears with a driven member adapted to drive a driven shaft, a one-way drive connection between said driven member and said driven shaft, means for shifting said selective means in one direction to effect an increase in the speed of said driven shaft and in the opposite direction after an increase of speed has been effected to decrease the speed of said driven shaft, means for driving said driven shaft independer ly of said speed changing gears and means for rendering said independent driving means effective prior to and during the shifting of said selective means in either direction, said independent driving means including a fluid coupling.

18. In a speed changing transmission, a driving shaft and a driven shaft, a driven member driven from said driving shaft, a one way drive between said driven member and said driven shaft releaseable when said driven shaft is driven at a speed greater than said driven member, a plurality of speed changing gears each having clutch teeth, a clutch member drivingly connected to said driven member having clutch teeth adapted for positive interengagement with the clutch teeth of said gears when the parts are operating in substantial synchronism, driving means for driving said driven shaft from said driving shaft at a speed greater than that of the driven member and including a fluid coupling, a fluid pressure operated piston for placing said clutch member under a bias into engaging and disengaging position, and a valve operated by the movement of said piston toward biasing position for admitting fluid pressure to said fluid coupling and by the movement of said piston into biasing position for shutting off the supply of fluid pressure to said fluid coupling.

19. In a speed changing transmission, a driving shaft and a driven shaft, a driven member driven from said driving shaft, a one way drive between said driven member and said driven shaft releaseable when said driven shaft is driven at a speed greater than said driven member, a plurality of speed changing gears each having clutch teeth, a clutch member drivingly connected to said driven member and having clutch teeth adapted for positive interengagement with the clutch teeth of said gears when the parts are operating in substantial synchronism, driving means for driving said driven shaft at a speed greater than the drive of said driven member and including a fluid coupling, a fluid pressure operated piston for placing said clutch member under a bias into engaging and disengaging position and having a lost motion relationship with said clutch member, a valve operated by the loss motion movement of said piston toward biasing position to admit fluid pressure to said fluid coupling and operated by the movement of said piston into its biasing position to shutting off the supply of fluid pressure to said fluid coupling.

20. In a speed changing transmission, in combination, a plurality of speed changing gears, selective means for selectively connecting said speed changing gears with a driven member adapted to drive a driven shaft, a one-way drive means between said driven member and said driven shaft, means for driving said driven shaft independently of said speed changing gears during said selective connection, means for operating said selective connection means having a lost motion connection therewith, and means operated by said operating means during its lost motion movement for initially effecting the operation of said independent drive means, said operating means after it has operated said selective means rendering said independent drive ineffective.

21. In a speed changing transmission, in combination, a plurality of speed changing means, a plurality of selective means for selectively connecting said speed changing means with a driven member adapted to drive a driven shaft, a one-way drive means between said driven member and said driven shaft, means for driving said driven shaft independent of said speed changing gears during said selective connection and including a fluid coupling, means for operating said selective connecting means having a lost motion connection therewith and a valve operated by said operating means during its lost motion for admitting fluid to said fluid coupling, said operating means after it has operated said selective means shutting off the supply of fluid to said fluid coupling.

22. In a speed changing transmission, in combination, a plurality of speed changing gears, selective means for selectively connecting said speed changing gears with a driven member adapted to drive a driven shaft, means for driving said driven shaft independently of said speed changing gears during said selective connection and including a fluid coupling, a fluid pressure operated piston for operating said selective connecting means and having a lost motion connection therewith and a valve operated during the lost motion movement of said piston for admitting fluid pressure to said fluid coupling, operating a means after it has operated said selective connecting means shutting off the supply of fluid pressure to said fluid coupling.

23. In a speed changing transmission, in combination, a plurality of speed changing gears adapted to drive a driven shaft at progressively increasing speeds, said gears being axially aligned and having a hollow bore extending therethrough, a driven member adapted to drive the driven shaft and adapted to be driven from said speed changing gears, means for selectively connecting said speed changing gears with said driven member, driving means for increasing the speed of the driven shaft, means for rendering said increased speed driving means operative before each successively higher speed gear is connected with said driven shaft, said means maintaining said increased speed means operative until the higher speed gear drive is effected, and a control device between said driven member and said driven shaft operating automatically to establish the drive between the driven member and driven shaft in response to the rendering of said increased driving means ineffective.

24. In a speed changing transmission, in combination, a driven shaft, a plurality of speed changing gears adapted to drive said shaft at increasing higher rates of speed, means for successively connecting said speed changing gears with said driven shaft including a one-way driving means, driving means for driving the driven shaft at an increased speed and means for successively rendering said increased speed driving means operative before each speed changing gear is drivingly connected to the driven shaft prior to the connection of said gear with the driven shaft, said means maintaining said increased speed driving means operative until after the higher speed drive is effected.

25. In a speed changing transmission, in combination, a plurality of speed changing gears, a selective means for successively connecting said speed changing gears with a driven member adapted to drive a driven shaft, a one-way drive between said driven member and said driven shaft, means for driving said driven shaft independently of said speed changing gears during said selective connection, and means for rendering said independent drive operative until after said selective connection has been effected.

26. In a speed changing transmission, in combination, a driven shaft, a plurality of speed changing gears, means for successively connecting said speed changing gears with a driven member adapted to drive said driven shaft, a one-way drive connection between said driven member and said driven shaft, means for taking the drive load off said connecting means when a change is made from one speed drive to another, and means for rendering said load taking means operative during a change from one speed drive to another, said means maintaining said load releasing drive effective until after the speed changing means has been completed.

27. In a speed changing transmission, in combination, a driven shaft, a plurality of speed changing gears, means for selectively connecting said speed changing gears with a driven member adapted to drive said driven shaft including a one-way drive between said driven member and said driven shaft, a fluid coupling for driving said driven shaft during a selective change from one speed gear to another, and means for rendering said fluid coupling operative during the change from one speed gear to another speed gear and maintaining said coupling effective until after the speed change has been made.

28. In a speed changing transmission, in combination, a driven shaft, a plurality of speed changing gears, positively interengaging clutch members for selectively connecting said speed changing gears with a driven member adapted to drive said driven shaft, means for driving said driven shaft independently of said speed changing gears during the shift of said clutch members from one speed change to another, and driving means interposed between said driven shaft and said driven member releasable when said clutch members are engaged while said independent driving means is effected.

WILLIAM B. BARNES.

REFERENCES CITED

The following references are of record in the file of this patent:

UNITED STATES PATENTS

| Number | Name | Date |
|---|---|---|
| 1,268,269 | Murray et al. | June 4, 1918 |
| 1,634,138 | Dallimore | June 28, 1927 |
| 1,676,802 | Rowlands | July 10, 1928 |
| 1,794,150 | Cook | Feb. 24, 1931 |
| 1,877,101 | Weydell | Sept. 13, 1932 |
| 1,903,013 | Salerni | Mar. 28, 1933 |
| 2,091,637 | Hoffman et al. | Aug. 31, 1937 |
| 2,103,156 | Fraser | Dec. 21, 1937 |
| 2,106,227 | Bush | Jan. 25, 1938 |
| 2,197,179 | Hersey | Apr. 16, 1940 |
| 2,222,144 | Ferris | Nov. 19, 1940 |
| 2,306,644 | Sewell | Dec. 29, 1942 |
| 2,323,592 | Gunberg | July 6, 1943 |
| 2,323,601 | Hobbs | July 6, 1943 |
| 2,400,536 | Chilton | May 21, 1946 |

FOREIGN PATENTS

| Number | Country | Date |
|---|---|---|
| 379,641 | Germany | Aug. 25, 1923 |

OTHER REFERENCES

Ser. No. 405,540 (A. P. C.) pub. May 4, 1943.
British Institute of Mechanical Engineers for 1935, vol. 130, pages 144, 145.